US012687046B2

(12) United States Patent
Wong et al.

(10) Patent No.: US 12,687,046 B2
(45) Date of Patent: Jul. 21, 2026

(54) DOUBLE-RING ELECTRONIC ANTI-THEFT LOCK

(71) Applicant: Guangzhou Hanex Hardware and Electronics Limited, Guangzhou (CN)

(72) Inventors: Chi Wai Wong, Guangzhou (CN); Tsz Cheve Wong, Guangzhou (CN)

(73) Assignee: Guangzhou Hanex Hardware and Electronics Limited, Guangzhou (CN)

( * ) Notice: Subject to any disclaimer, the term of this patent is extended or adjusted under 35 U.S.C. 154(b) by 0 days.

(21) Appl. No.: 19/015,876

(22) Filed: Jan. 10, 2025

(65) Prior Publication Data

US 2026/0146478 A1 May 28, 2026

(30) Foreign Application Priority Data

Nov. 28, 2024 (CN) ........................ 202411726921.6

(51) Int. Cl.
*E05B 73/00* (2006.01)
*E05B 47/06* (2006.01)

(52) U.S. Cl.
CPC ...... *E05B 73/0005* (2013.01); *E05B 47/0611* (2013.01); *E05B 73/0017* (2013.01)

(58) Field of Classification Search
CPC .... E05B 67/003; E05B 71/00; E05B 73/0005; E05B 45/005; E05B 45/06; E05B 45/12; E05B 2045/062; E05B 2045/065
See application file for complete search history.

(56) References Cited

U.S. PATENT DOCUMENTS

| | | | | |
|---|---|---|---|---|
| 9,243,428 | B1 * | 1/2016 | Miracle | E05B 73/0005 |
| 2005/0262904 | A1 * | 12/2005 | Ling | E05B 67/003 70/49 |
| 2006/0032276 | A1 * | 2/2006 | Early | E05B 73/007 70/58 |
| 2022/0220773 | A1 * | 7/2022 | Barrett | B62H 5/20 |

FOREIGN PATENT DOCUMENTS

| | | | |
|---|---|---|---|
| CN | 217602359 U * | 10/2022 | E05B 67/003 |

OTHER PUBLICATIONS

Translation of CN 217602359 (Year: 2022).*

* cited by examiner

*Primary Examiner* — Christine M Mills
*Assistant Examiner* — Yahya Sidky
(74) *Attorney, Agent, or Firm* — Nitin Kaushik

(57) ABSTRACT

A double-ring electronic anti-theft lock includes: an iron chain having a first state and a second state; a slider lock rod set on the iron chain; a locking assembly set at one end of the iron chain; an iron ring set at the end of the iron chain away from the locking assembly. When the iron chain is in the first state, the locking assembly does not contact the slider lock rod, and the iron ring is not fitted on the iron chain. When the iron chain is in the second state, the locking assembly contacts the slider lock rod, and the iron ring is fitted on the iron chain. By passing the iron ring through the locking assembly and the slider lock rod and fitting it on the iron chain, the locking assembly is locked with the slider lock rod, thus forming the iron chain into a figure-8 shape.

7 Claims, 3 Drawing Sheets

DOUBLE-RING ELECTRONIC ANTI-THEFT LOCK

CROSS REFERENCE TO THE RELATED APPLICATIONS

This application is based upon and claims priority to Chinese Patent Application No. 202411726921.6, filed on Nov. 28, 2024, the entire contents of which are incorporated herein by reference.

TECHNICAL FIELD

This application relates to a lock, particularly to a double-ring electronic anti-theft lock.

BACKGROUND

Currently, existing chain locks and wire rope locks in the market mostly secure objects by forming a circle with the chain or wire rope, which is inconvenient for locking onto external third-party fixed objects. Moreover, their structure usually adopts a purely mechanical lock and key structure to achieve locking and opening, with a simple structure, and few such locks have electronic alarm functions, making them easily pried open by force externally by criminals when left unattended.

SUMMARY

The embodiments of this application provide a double-ring electronic anti-theft lock to solve the problems existing in related technologies, with the following technical solution:

The embodiments of this application provide a double-ring electronic anti-theft lock, including:

- an iron chain, the iron chain having a first state and a second state;
- a slider lock rod, the slider lock rod set on the iron chain;
- a locking assembly, the locking assembly set at one end of the iron chain;
- an iron ring, the iron ring set at the end of the iron chain away from the locking assembly;
- when the iron chain is in the first state, the locking assembly does not contact the slider lock rod, and the iron ring is not fitted on the iron chain;
- when the iron chain is in the second state, the locking assembly contacts the slider lock rod, and the iron ring is fitted on the iron chain.

In one embodiment, it also includes:

- an electronic component, the electronic component set inside the locking assembly.

In one embodiment, it also includes:

- a fabric sleeve for iron chain, the fabric sleeve for iron chain set on the iron chain, the slider lock rod fitted on the fabric sleeve for iron chain;
- a fastening joint for fabric sleeve, the fastening joint for fabric sleeve set on the end of the fabric sleeve for iron chain near the locking assembly, the iron chain passing through the fastening joint for fabric sleeve and connecting with the locking assembly;
- a joint, the joint set on the end of the sleeve near the iron ring.

In one embodiment, the locking assembly includes:

- a lock body, the lock body connected to the iron chain, the electronic component set on the lock body, when the iron chain is in the second state, the lock body locks with the slider lock rod, the electronic component matches with the slider lock rod;
- a rivet, the rivet set on the lock body, one end of the iron chain connected to the lock body through the rivet;
- a rubber sleeve for lock body, the rubber sleeve for lock body fitted on the lock body.

In one embodiment, the rubber sleeve for lock body includes:

- an upper rubber sleeve, the upper rubber sleeve fitted on the lock body;
- a lower rubber sleeve, the lower rubber sleeve fitted on the lock body, the lower rubber sleeve located below the upper rubber sleeve, the lower rubber sleeve having a through hole matching with the slider lock rod;
- a marking cover plate, the marking cover plate set between the upper rubber sleeve and the lower rubber sleeve, to fix the upper rubber sleeve relative to the lower rubber sleeve.

In one embodiment, the lock body includes:

- a casing, the casing having a recess matching with the electronic component;
- a lock cylinder, the lock cylinder set on the casing, the lock cylinder having a keyhole on top;
- a lock core, the lock core set inside the casing, the lock core connected to the lock cylinder, the lock core moving with the lock cylinder, the slider lock rod locking with the lock core.

In one embodiment, the lock core has a semicircular groove of lock core, the slider lock rod has a semicircular groove of lock rod matching with the semicircular groove of lock core, inserting the key into the keyhole, turning the lock core clockwise by ninety degrees with the key to disengage the slider lock rod from between the semicircular groove of lock core and the casing.

In one embodiment, the slider lock rod is provided with a magnetic signal transmitting end, the electronic component is provided with a magnetic signal receiving end, when the slider lock rod is locked with the lock core, the magnetic signal transmitting end corresponds to the magnetic signal receiving end.

In one embodiment, the casing has a recess for placing the electronic component, the electronic component is fixed in the recess by screws, when the lock core is locked with the slider lock rod, the screws face towards the slider lock rod.

In one embodiment, the iron chain also has a third state, when the iron chain is in the third state, the lock core is locked with the slider lock rod, the iron ring is not fitted on the iron chain.

The Advantages or Beneficial Effects of the Above Technical Solution Include at Least the following.

By passing the iron ring through the locking assembly and the slider lock rod and then fitting it on the iron chain, the locking assembly is locked with the slider lock rod, thus forming the iron chain into a figure-8 shape. Compared to traditional U-shaped locks or chain locks, it is easier to lock the anti-theft lock to external fixed objects. By designing the iron chain, iron ring, and locking assembly as an integrated structure, it is more convenient for storage and use compared to traditional separate locks.

The above summary is only for the purpose of the specification and is not intended to be limiting in any way. In addition to the illustrative aspects, embodiments, and features described above, further aspects, embodiments, and features will be apparent by reference to the drawings and the following detailed description.

BRIEF DESCRIPTION OF THE DRAWINGS

In the drawings, unless otherwise specified, the same reference marks throughout multiple drawings represent the same or similar components or elements. These drawings are not necessarily drawn to scale. It should be understood that these drawings only depict some embodiments disclosed according to this application and should not be viewed as limiting the scope of the application.

REFERENCE NUMERALS

Figure 1:
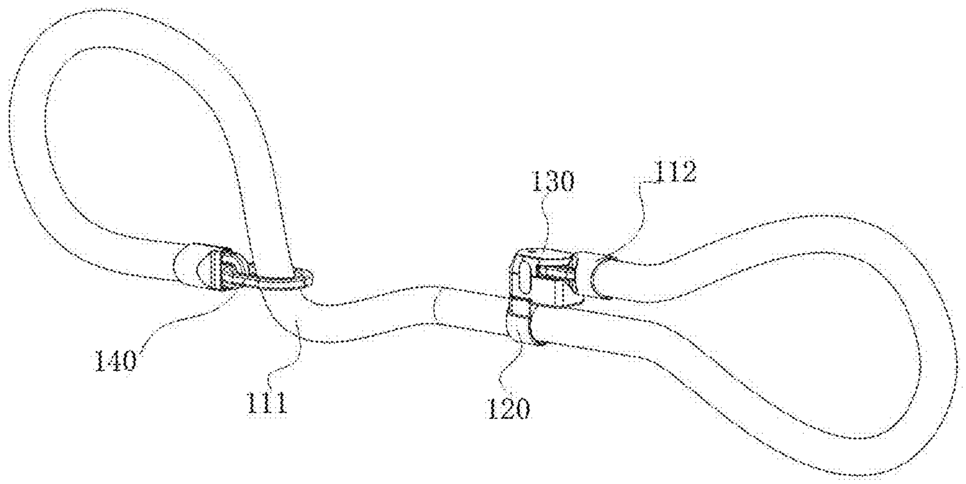
FIG. 1 is a structural diagram of the iron chain in the first state
Figure 2:
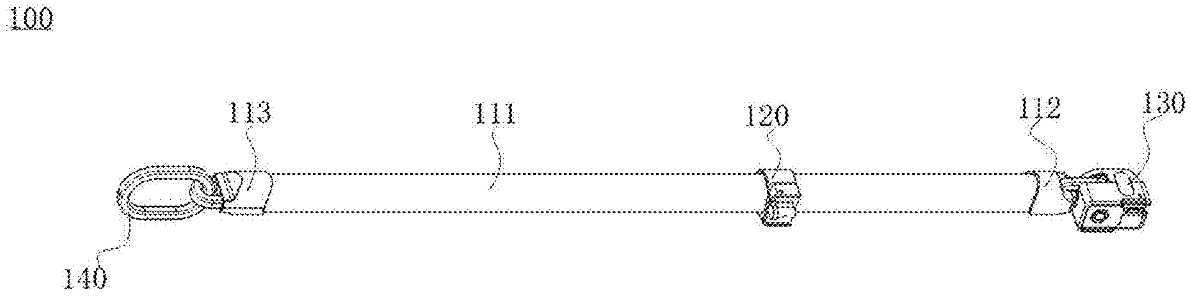
FIG. 2 is a structural diagram of the iron chain in the second state.

- 100-anti-theft lock;
- 110-iron chain; 111-fabric sleeve for iron chain; 112-fastening joint for fabric sleeve; 113-joint; 1131-upper joint; 1132-lower joint;
- 120-slider lock rod; 121-magnetic signal transmitting end; 122-semicircular groove of lock rod;
- 130-locking assembly; 131-lock body; 1311-casing; 1312-lock cylinder; 1313-lock core; 1314-semicircular groove of lock core; 132-rivet; 133-rubber sleeve for lock body; 1331-upper rubber sleeve; 1332-lower rubber sleeve; 1333-marking cover plate;
- 140-iron ring;
- 150-electronic component; 151-magnetic signal receiving end.

DETAILED DESCRIPTION OF THE EMBODIMENTS

In the following, only some exemplary embodiments are briefly described. As those skilled in the art will recognize, the described embodiments can be modified in various different ways without departing from the spirit or scope of this application. Therefore, the drawings and description are considered to be essentially exemplary rather than limiting.

FIGS. 1-6 show structural diagrams of a double-ring electronic anti-theft lock 100 according to an embodiment of this application. As shown in FIGS. 1-6, the anti-theft lock 100 may include:

- an iron chain 110, the iron chain 110 having a first state and a second state;
- a slider lock rod 120, the slider lock rod 120 set on the iron chain 110;
- a locking assembly 130, the locking assembly 130 set at one end of the iron chain 110;
- an iron ring 140, the iron ring 140 set at the end of the iron chain 110 away from the locking assembly 130;
- when the iron chain 110 is in the first state, the locking assembly 130 does not contact the slider lock rod 120, and the iron ring 140 is not fitted on the iron chain 110;
- when the iron chain 110 is in the second state, the locking assembly 130 contacts the slider lock rod 120, and the iron ring 140 is fitted on the iron chain 110.

In this embodiment, the first state of the iron chain 110 is the unused state, where the locking assembly 130 does not contact the slider lock rod 120. The second state of the iron chain 110 is the in-use state, where the iron ring 140 is fitted on the iron chain 110, the slider lock rod 120 is locked with the locking assembly 130, and the iron chain 110 is arranged in a figure-8 shape. When switching the iron chain 110 from the first state to the second state, pass the iron ring 140 through the locking assembly 130, then through the slider lock rod 120, and fit it on the iron chain 110. After fitting, lock the locking assembly 130 with the slider lock rod 120, thus switching the iron chain 110 from the first state to the second state.

By passing the iron ring 140 through the locking assembly 130 and the slider lock rod 120 and then fitting it on the iron chain 110, the locking assembly 130 is locked with the slider lock rod 120, thus forming the iron chain 110 into a figure-8 shape. Compared to traditional U-shaped locks or chain locks, it is easier to lock the anti-theft lock 100 to external fixed objects. By designing the iron chain 110, iron ring 140, and locking assembly 130 as an integrated structure, it is more convenient for storage and use compared to traditional separate locks.

Furthermore, the iron chain 110, locking assembly 130, and slider lock rod 120 are all made of hardened, saw-resistant carbon steel material. The surface of the carbon steel material needs to be hardened by heat treatment. The iron chain 110 can also be replaced with other hardened, saw-resistant materials. The slider lock rod 120 can slide on the iron chain 110, making it convenient to adjust when locking the iron chain 110, thus adapting to objects of different sizes that need to be locked.

The slider lock rod 120 is slidably set on the iron chain 110. The position of the slider lock rod 120 can be adjusted according to the actual size of the object to be locked. That is, when the iron chain 110 is in a figure-8 shape, the size of the two rings can be adjusted according to the actual size of the object to be locked.

Figure 3:
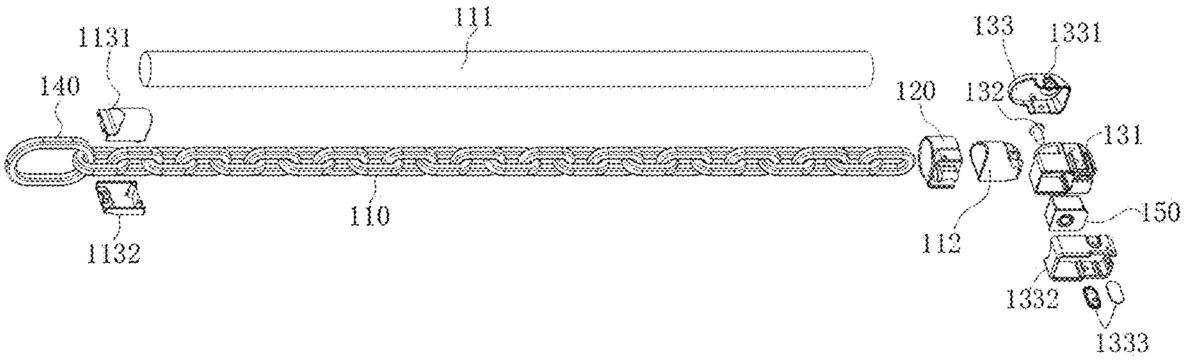
FIG. 3 is an exploded structural diagram of FIG. 2.
Figure 4:
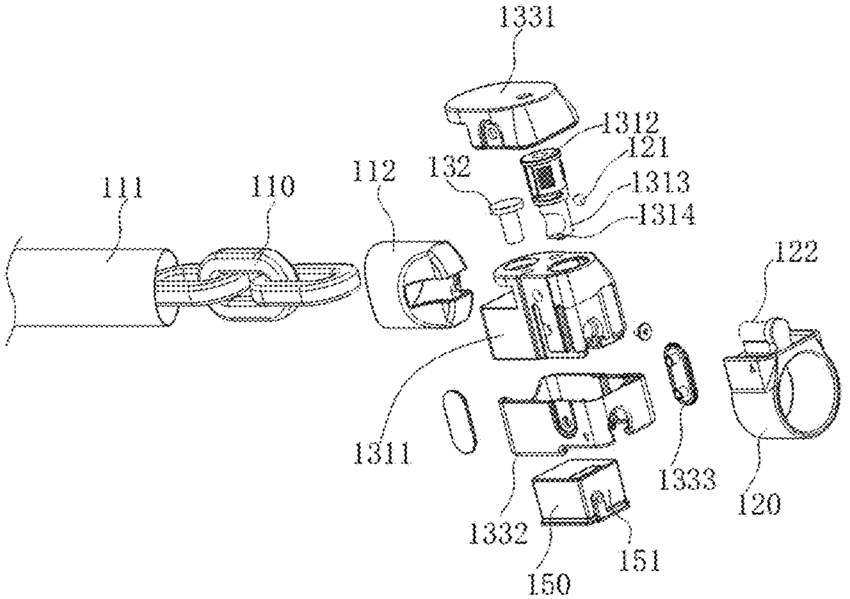
FIG. 4 is an exploded structural diagram of the lock body in FIG. 2.
Figure 5:
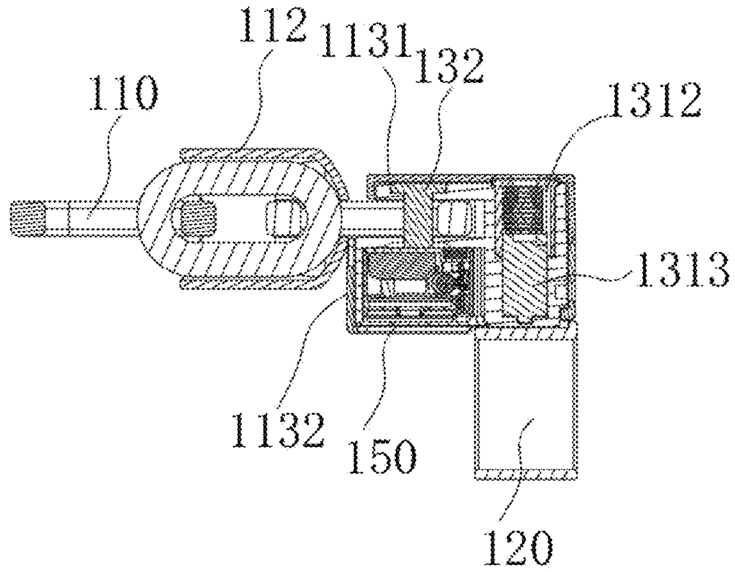
FIG. 5 is a sectional view when the slider lock rod is locked with the locking assembly.

As shown in FIGS. 3-5, in one embodiment, the anti-theft lock also includes:

- an electronic component 150, the electronic component 150 set inside the locking assembly 130.

In this embodiment, by setting the electronic component 150 inside the locking assembly 130, when the locking assembly 130 locks with the slider lock rod 120, the electronic component 150 corresponds to the slider lock rod 120. The electronic component 150 detects the signal strength of the signal transmitting device on the slider lock rod 120 to determine if the lock pin has been forcibly disassembled and to set an alarm, with good fault tolerance. Using a modular electronic component 150 makes it convenient for maintenance and replacement.

Furthermore, when the locking assembly 130 locks with the slider lock rod 120, an electrical signal is formed between the electronic component 150 and the slider lock rod 120. The electronic component 150 is a rechargeable electronic component 150, with a built-in magnetic signal receiving end 151, rechargeable battery, alarm, and PCB circuit board. The alarm, battery, and magnetic signal receiving end 151 are all set on the PCB board. The PCB board has a processing module. When the slider lock rod 120 is forcibly disassembled from the locking assembly 130, the alarm sounds.

As shown in FIGS. 1-4, in one embodiment, the anti-theft lock also includes:

- a fabric sleeve for iron chain 111, the fabric sleeve for iron chain 111 set on the iron chain 110, the slider lock rod 120 fitted on the fabric sleeve for iron chain 111;
- a fastening joint for fabric sleeve 112, the fastening joint for fabric sleeve 112 set on the end of the fabric sleeve for iron chain 111 near the locking assembly 130, the iron chain 110 passing through the fastening joint for fabric sleeve 112 and connecting with the locking assembly 130;
- a joint 113, the joint 113 set on the end of the sleeve near the iron ring 140.

In this embodiment, after the iron chain 110 passes through the fabric sleeve for iron chain 111, one end is fitted with a fastening joint for fabric sleeve 112, and the other end has a joint 113. Through the setting of the fastening joint for fabric sleeve 112 and joint 113, the two ends of the fabric sleeve for iron chain 111 are fixed on the iron chain 110, preventing the fabric sleeve for iron chain 111 from moving, while also protecting the iron chain 110 through the setting of the fabric sleeve for iron chain 111.

Furthermore, the joint 113 is divided into an upper joint 1131 and a lower joint 1132. The upper joint 1131 and lower joint 1132 clamp and fix the fabric sleeve for iron chain 111, securing the fabric sleeve for iron chain 111 to the iron chain 110 through the upper joint 1131 and lower joint 1132.

As shown in FIGS. 1-5, in one embodiment, the locking assembly 130 includes:

- a lock body 131, the lock body 131 connected to the iron chain 110, the electronic component 150 set on the lock body 131, when the iron chain 110 is in the second state, the lock body 131 locks with the slider lock rod 120, the electronic component 150 matches with the slider lock rod 120;
- a rivet 132, the rivet 132 set on the lock body 131, one end of the iron chain 110 connected to the lock body 131 through the rivet 132;
- a rubber sleeve for lock body 133, the rubber sleeve for lock body 133 fitted on the lock body 131.

In this embodiment, the lock body 131 is designed to lock with the slider lock rod, the rivet 132 passes through the ring at one end of the iron chain, fixing the chain to the lock body 131, and the rubber sleeve for lock body 133 is fitted over the lock body 131 to protect it.

Furthermore, the rubber sleeve for lock body 133 includes:

- an upper rubber sleeve 1331, the upper rubber sleeve 1331 fitted on the lock body 131;
- a lower rubber sleeve 1332, the lower rubber sleeve 1332 fitted on the lock body 131, the lower rubber sleeve 1332 located below the upper rubber sleeve 1331, the lower rubber sleeve 1332 having a through hole matching with the slider lock rod 120;
- a marking cover plate 1333, the marking cover plate 1333 set between the upper rubber sleeve 1331 and the lower rubber sleeve 1332, to fix the upper rubber sleeve 1331 relative to the lower rubber sleeve 1332;
- By dividing the rubber sleeve for lock body 133 into an upper rubber sleeve 1331, a lower rubber sleeve 1332, and a marking cover plate 1333, it is easier to fit the rubber sleeve onto the lock body 131, thus facilitating disassembly, maintenance, and protection of the lock body 131.

As shown in FIGS. 3-4, in one embodiment, the lock body 131 includes:

- a casing 1311, the casing 1311 having a recess matching with the electronic component 150;
- a lock cylinder 1312, the lock cylinder 1312 set on the casing 1311, the lock cylinder 1312 having a keyhole on top;
- a lock core 1313, the lock core 1313 set inside the casing 1311, the lock core 1313 connected to the lock cylinder 1312, the lock core 1313 moving with the lock cylinder 1312, the slider lock rod 120 locking with the lock core 1313.

Figure 6:
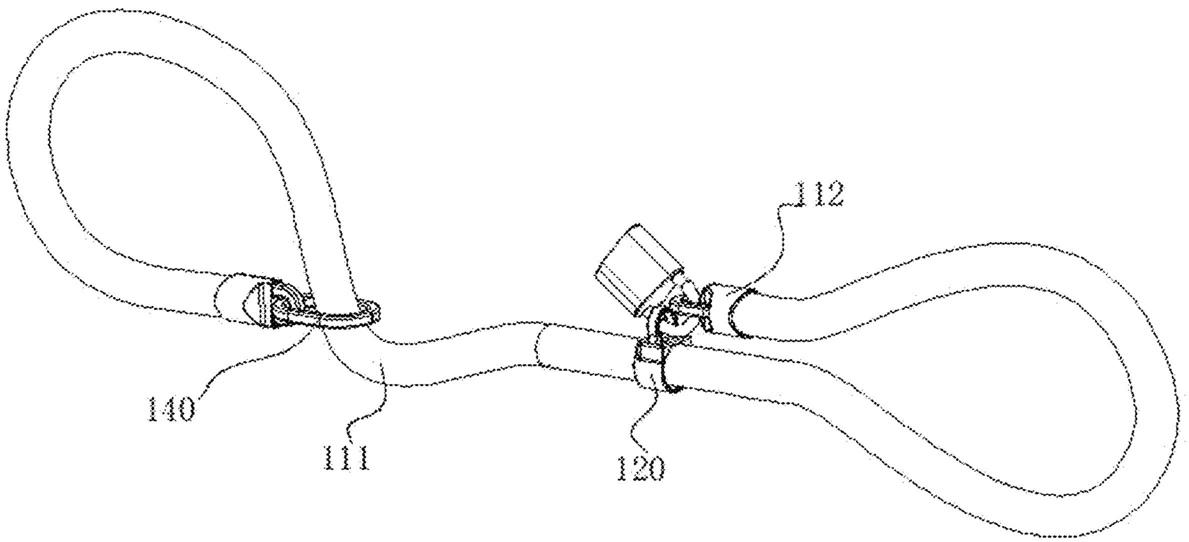
FIG. 6 is a structural diagram of other shape combinations of the slider lock rod and lock core.

In this embodiment, the casing 1311 has a U-shaped groove matching with one end of the iron chain 110. The rivet 132 passes through the U-shaped groove to fix the iron chain 110 inside the U-shaped groove, allowing the casing 1311 to move relative to the iron chain 110 while also securing the casing 1311 to the iron chain 110. The lock cylinder 1312 is installed on top of the lock body 131, with a keyhole on its top. The lock core 1313 is connected to the lock cylinder 1312 and can rotate with it. The lower half of the lock core 1313 has a semicircular groove of lock core 1313 that matches the semicircular groove of lock rod on the slider lock rod 120. When the lock core 1313 is turned clockwise by 90 degrees to the unlocked state, the semicircular groove of lock core 1313 forms a channel with the casing 1311, allowing the slider lock rod to be removed from the lock body 131. Conversely, when the lock core 1313 is turned counterclockwise by 90 degrees to the locked state, the slider lock rod is positioned inside the channel, with the semicircular groove of lock core 1313 and the semicircular groove of lock rod forming an interlocking obstruction, preventing the slider lock rod from being removed, thus achieving the locking function of the lock core 1313;

The lock body 131 is not limited to the rotating lock core mode. Through the design of the slider lock rod 120 shape, it can adapt to different lock bodies 131. As shown in FIG. 6, the slider lock rod 120 can be set as a circular ring or cylindrical hole structure, compatible with padlocks, push-button lock cores, double push-button lock cores, and other matching structures.

Furthermore, the lock core 1313 has a semicircular groove of lock core, the slider lock rod 120 has a semicircular groove of lock rod matching with the semicircular groove of lock core, inserting the key into the keyhole, turning the lock core 1313 clockwise by ninety degrees with the key to disengage the slider lock rod 120 from between the semicircular groove of lock core and the casing 1311;

It should be noted that the lock core 1313 is equipped with a spring. By turning the lock core 1313 with the key, it ensures that the lock core 1313 returns to its position promptly after removing the key, achieving the locking of the slider lock rod. Alternatively, locking can be achieved by turning the lock core 1313 without a spring.

As shown in FIGS. 3-5, in one embodiment, the slider lock rod 120 is provided with a magnetic signal transmitting end 121, the electronic component 150 is provided with a magnetic signal receiving end 151, when the slider lock rod 120 is locked with the lock core 1313, the magnetic signal transmitting end 121 corresponds to the magnetic signal receiving end 151.

In this embodiment, the slider lock rod 120 is equipped with a magnetic signal transmitting end 121; the rechargeable electronic component 150 is fixed inside the lock body 131 by screws, and the electronic component 150 contains a device for detecting signal strength. When the lock core 1313 is turned counterclockwise by 90 degrees to lock, the magnetic signal transmitting end 121 aligns perfectly with the magnetic signal receiving end 151, activating the alarm signal. Conversely, when unlocking, the lock core 1313 is turned clockwise by 90 degrees, avoiding the two signals and disarming the alarm.

As shown in FIGS. 3-5, in one embodiment, the casing 1311 has a recess for placing the electronic component 150, the electronic component 150 is fixed in the recess by screws, when the lock core 1313 is locked with the slider lock rod 120, the screws face towards the slider lock rod 120.

In this embodiment, the electronic component 150 is fixed in the recess of the casing 1311 by screws, facilitating the positioning of the electronic component 150 and making it easy to disassemble. The electronic component 150 is set in the recess, and when the lower rubber sleeve 1332 is fitted, it wraps the electronic component 150 together inside the casing 1311, providing protection for the electronic component 150;

When the lock core 1313 is locked with the slider lock rod 120, the screws face towards the slider lock rod 120, thus concealing the screws when the lock core 1313 is locked with the slider lock rod 120, preventing the electronic component 150 from being disassembled externally when the lock core 1313 is locked with the slider lock rod 120.

In one embodiment, the iron chain 110 also has a third state, when the iron chain 110 is in the third state, the lock core 1313 is locked with the slider lock rod 120, the iron ring 140 is not fitted on the iron chain 110.

In this embodiment, when the iron chain 110 is in the third state, the iron ring 140 is not fitted on the iron chain 110, and the lock core 1313 directly locks with the slider lock rod, giving the iron chain 110 the same locking function as normal iron chain locks on the market.

The functions of each module in the devices of this application's embodiments can be referred to in the corresponding descriptions in the above methods, and will not be repeated here.

In the description of this specification, references to "an embodiment", "some embodiments", "example", "specific example", or "some examples" etc. mean that the specific features, structures, materials, or characteristics described in connection with the embodiment or example are included in at least one embodiment or example of the present application. Moreover, the described specific features, structures, materials, or characteristics may be combined in any suitable manner in any one or more embodiments or examples. Furthermore, in cases where there is no contradiction, those skilled in the art can combine and combine different embodiments or examples and features of different embodiments or examples described in this specification.

In addition, the terms "first", "second" are used only for descriptive purposes and cannot be understood as indicating or implying relative importance or implicitly indicating the number of technical features indicated. Thus, features defined as "first", "second" may explicitly or implicitly include at least one such feature. In the description of this application, "multiple" means two or more, unless otherwise explicitly specified.

The above description is only for specific embodiments of this application, but the scope of protection of this application is not limited to this. Any person skilled in this technical field can easily conceive various changes or substitutions within the technical scope disclosed in this application, which should all be covered within the scope of protection of this application. Therefore, the scope of protection of this application should be based on the scope of protection of the claims.

The invention claimed is:

1. A double-ring electronic anti-theft lock, comprising:
- an iron chain, wherein the iron chain has a first state and a second state;
- a slider lock rod, wherein the slider lock rod is set on the iron chain;
- a locking assembly, wherein the locking assembly is set at a first end of the iron chain; and
- an iron ring, wherein the iron ring is set at a second end of the iron chain, and the second end of the iron chain is away from the locking assembly;
- wherein when the iron chain is in the first state, the locking assembly does not contact the slider lock rod, and the iron ring is not fitted on the iron chain; and
- when the iron chain is in the second state, the locking assembly contacts the slider lock rod, and the iron ring is fitted on the iron chain,
- wherein the locking assembly comprises:
  - a lock body, wherein the lock body is connected to the iron chain, and an electronic component is set on the lock body; when the iron chain is in the second state, the lock body locks with the slider lock rod, and the electronic component matches with the slider lock rod;
  - a rivet, wherein the rivet is set on the lock body, and the first end of the iron chain is connected to the lock body through the rivet; and
  - a rubber sleeve for the lock body, wherein the rubber sleeve is fitted on the lock body, wherein the rubber sleeve comprises:
  - an upper rubber sleeve, wherein the upper rubber sleeve is fitted on the lock body;
  - a lower rubber sleeve, wherein the lower rubber sleeve is fitted on the lock body, the lower rubber sleeve is located below the upper rubber sleeve, and the lower rubber sleeve has a through hole matching with the slider lock rod; and
  - a marking cover plate, wherein the marking cover plate is set between the upper rubber sleeve and the lower rubber sleeve, to fix the upper rubber sleeve relative to the lower rubber sleeve.

2. The double-ring electronic anti-theft lock according to claim 1, further comprising:
- a fabric sleeve for the iron chain, wherein the fabric sleeve is set on the iron chain, and the slider lock rod is fitted on the fabric sleeve;
- a fastening joint for the fabric sleeve, wherein the fastening joint is set on an end of the fabric sleeve near the locking assembly, and the iron chain passes through the fastening joint and is connected with the locking assembly; and
- an additional joint, wherein the additional joint is set on an end of the fabric sleeve near the iron ring.

3. The double-ring electronic anti-theft lock according to claim 1, wherein
- the lock body comprises:
- a casing, wherein the casing has a recess matching with the electronic component;
- a lock cylinder, wherein the lock cylinder is set on the casing, and the lock cylinder has a keyhole on top; and
- a lock core, wherein the lock core is set inside the casing, the lock core is connected to the lock cylinder, the lock core moves with the lock cylinder, and the slider lock rod locks with the lock core.

4. The double-ring electronic anti-theft lock according to claim 3, wherein the lock core has a semicircular groove of the lock core, and the slider lock rod has a semicircular groove of the lock rod matching with the semicircular groove of the lock core, wherein a key is inserted into the keyhole, and the lock core is turned clockwise by ninety degrees with the key to disengage the slider lock rod from between the semicircular groove of the lock core and the casing.

5. The double-ring electronic anti-theft lock according to claim 3, wherein the slider lock rod is provided with a magnetic signal transmitting end, and the electronic component is provided with a magnetic signal receiving end; and when the slider lock rod is locked with the lock core, the magnetic signal transmitting end corresponds to the magnetic signal receiving end.

6. The double-ring electronic anti-theft lock according to claim 3, wherein the casing has a recess for placing the electronic component, and the electronic component is fixed in the recess by screws; and when the lock core is locked with the slider lock rod, the screws face towards the slider lock rod.

7. The double-ring electronic anti-theft lock according to claim 3, wherein the iron chain also has a third state; and when the iron chain is in the third state, the lock core is locked with the slider lock rod, and the iron ring is not fitted on the iron chain.

* * * * *